(12) United States Patent
Uthe

(10) Patent No.: US 7,605,813 B2
(45) Date of Patent: *Oct. 20, 2009

(54) DISPLAYING ARBITRARY RELATIONSHIPS IN A TREE-MAP VISUALIZATION

(75) Inventor: Robert Thomas Uthe, Morrisville, NC (US)

(73) Assignee: International Business Machines Corporation, Armonk, NY (US)

(*) Notice: Subject to any disclaimer, the term of this patent is extended or adjusted under 35 U.S.C. 154(b) by 430 days.

This patent is subject to a terminal disclaimer.

(21) Appl. No.: 10/420,685

(22) Filed: Apr. 22, 2003

(65) Prior Publication Data

US 2004/0212615 A1 Oct. 28, 2004

(51) Int. Cl.
G06T 11/20 (2006.01)

(52) U.S. Cl. .................. 345/440; 345/440.2; 715/853; 715/854; 715/855

(58) Field of Classification Search ................. 345/440, 345/440.2, 853, 854, 855, 808, 809, 823; 715/853, 854, 855, 808, 809
See application file for complete search history.

(56) References Cited

U.S. PATENT DOCUMENTS

| | | | |
|---|---|---|---|
| 5,619,632 A | 4/1997 | Lamping et al. | 395/141 |
| 5,903,870 A | 5/1999 | Kaufman | |
| 5,926,180 A * | 7/1999 | Shimamura | 715/739 |
| 5,974,384 A | 10/1999 | Yasuda | |
| 6,057,843 A * | 5/2000 | Van Overveld et al. | 345/854 |
| 6,212,548 B1 | 4/2001 | DeSimone et al. | |
| 6,259,458 B1 * | 7/2001 | Theisen et al. | 345/440 |
| 6,271,841 B1 | 8/2001 | Tsujimoto | |
| 6,301,579 B1 * | 10/2001 | Becker | 707/102 |
| 6,304,260 B1 * | 10/2001 | Wills | 345/853 |
| 6,496,842 B1 * | 12/2002 | Lyness | 345/854 |
| 6,509,898 B2 * | 1/2003 | Chi et al. | 345/440 |
| 6,774,911 B2 * | 8/2004 | Hodgson et al. | 345/853 |
| 6,810,516 B2 * | 10/2004 | Lauris | 717/105 |
| 6,829,615 B2 * | 12/2004 | Schirmer et al. | 707/102 |

(Continued)

OTHER PUBLICATIONS

Cushion treemaps: visualization of hierarchical information Van Wijk, J.J.; Van de Wetering, H.; Information Visualization, 1999. (Info Vis '99) Proceedings. 1999 IEEE Symposium on Oct. 24-29, 1999 pp. 73-78, 147 Digital Object Identifier 10.1109/INFVIS.1999. 801860.*

(Continued)

Primary Examiner—Javid A Amini
(74) Attorney, Agent, or Firm—Gerald R. Woods, Esq.; Steven M. Greenberg, Esq.; Carey Rodriguez Greenberg & Paul LLP

(57) ABSTRACT

A treemap visualization system can include a treemap configured to visualize a set of nodes. The treemap visualization system also can include an event handler programmed to process a proximity event associated with a specific portion of the treemap. The event handler can process the proximity event by visually coupling selected nodes which are inter-related to a node associated with the proximity event. The system further can include logic for displaying a direction for each inter-relationship between the selected nodes and the node associated with the proximity event. In this regard, the proximity event can include a mouse-over event, a mouse-click event, and a keyboard selection event.

23 Claims, 3 Drawing Sheets

U.S. PATENT DOCUMENTS

| | | | | |
|---|---|---|---|---|
| 6,952,688 | B1* | 10/2005 | Goldman et al. | 706/45 |
| 6,983,288 | B1* | 1/2006 | Kirkwood et al. | 707/103 R |
| 7,039,642 | B1* | 5/2006 | Horvitz et al. | 707/100 |
| 7,139,973 | B1* | 11/2006 | Kirkwood et al. | 715/206 |
| 7,346,622 | B2* | 3/2008 | Horvitz et al. | 707/100 |
| 2002/0118214 | A1 | 8/2002 | Card et al. | 345/619 |
| 2002/0154171 | A1* | 10/2002 | Lee et al. | 345/781 |
| 2003/0050906 | A1* | 3/2003 | Clifton-Bligh | 707/1 |
| 2003/0131007 | A1* | 7/2003 | Schirmer et al. | 707/100 |
| 2004/0168115 | A1* | 8/2004 | Bauernschmidt et al. | 715/500 |
| 2004/0212615 | A1* | 10/2004 | Uthe | 345/440 |
| 2005/0165766 | A1* | 7/2005 | Szabo | 707/3 |
| 2006/0044307 | A1* | 3/2006 | Song | 345/419 |

OTHER PUBLICATIONS

Using a multiple view system in a virtual environment to explore and interpret communication data sets André Hinkenjann Nov. 2001 AFRIGRAPH '01: Proceedings of the 1st international conference on Computer graphics, virtual reality and visualisation.*

Simon Urbanek; Many Faces of a Tree; Mar. 14, 2003; Interface 2003: Security and Infrastructure Protection, 35th Symposium on the Interface, Salt Lake City, Utah ,Mar. 12-15, 2003, pp. 1-9.*

Bill Kules, Ben Shneiderman and Catherine Plaisant; Data Exploration with Paired Hierarchical Visualizations: Initial Designs of PairTrees; May 18-21, 2003; Proceedings of the 2003 annual national conference on Digital government research, Boston, MA Source ACM International Conference Proceeding Series; vol. 130; pp. 1-6.*

* cited by examiner

DISPLAYING ARBITRARY RELATIONSHIPS IN A TREE-MAP VISUALIZATION

BACKGROUND OF THE INVENTION

1. Statement of the Technical Field

The present invention relates to the field of data visualization and more particularly, to tree-map visualization.

2. Description of the Related Art

As computer technology advances, computing systems have undertaken the management and processing of even larger data systems. With data systems ranging from massive standalone databases to vast distributed networks, oftentimes the limiting factor in analyzing the state of a given system rests not with computing resources, but with the human operator. Specifically, though the computing system may aggregate vast quantities of data in near real-time, in the end, a human being must visualize the compilation of data to draw effective conclusions from the visualization. Yet, the ability of the end user to digest compiled information varies inversely with the amount of data presented to the end user. Where the amount of compiled data becomes excessive, it can be nearly impossible for a human being to adequately analyze the data.

In an effort to address the foregoing difficulties, tree-map visualization methods have been developed. Initially proposed by Brian Johnson and Ben Shneiderman in the seminal paper, Johnson et al., *Tree-Maps: A Space-Filling Approach to the Visualization of Hierarchical Information Structures*, Dept. of Computer Science & Human-interaction Laboratory (University of Maryland June 1991), tree-map visualization techniques map "hierarchical information to a rectangular 2-D display in a space-filling manner" in which the entirety of a designated display space is utilized. Additionally, "[i]nteractive control allows users to specify the presentation of both structural (depth bounds, etc.) and content (display properties such as color mappings) information."

Notably, tree-map visualization techniques can be compared in a contrasting manner to traditional static methods of displaying hierarchically structured information. According to conventional static methods, a substantial portion of hierarchical information can be hidden from user view to accommodate the view of the hierarchy itself. Alternatively, the entire hierarchy can be visually represented, albeit vast amounts of display space can be obscured, hence wasted simply to accommodate the structure without regard to the hierarchical data in the hierarchy itself.

In the tree-map visualization technique, however, sections of the hierarchy containing more important information can be allocated more display space while portions of the hierarchy which are deemed less important to the specific task at hand can be allocated less space. More particularly, in operation tree-maps partition the display space into a collection of rectangular bounding boxes representing the tree structure. The drawing of nodes within the bounding boxes can be entirely dependent on the content of the nodes, and can be interactively controlled. Since the display size is user controlled, the drawing size of each node varies inversely with the size of the tree, for instance the number of nodes. Thus, trees having many nodes can be displayed and manipulated in a fixed display space.

To date, the tree-map visualization technique has been limited to displaying strictly hierarchical data. This is a significant limitation that impedes the usefulness of the tree-map in many circumstances. For example, where a tree-map is used to visualize a set of computing resources which are interconnected to provide business value in a network, an observer can view the individual components of the network, but the relationship will not be as apparent. Specifically, though the status of any particular component in the tree-map can be displayed when a pointing device falls within proximity to the representation of the component in the tree-map, the relationship between the component and other components represented in the tree-map cannot be so readily recognized.

Lacking an awareness of the relationship of node representations in a tree-map can impede the "big picture" analysis of the overall system represented by the tree-map. For example, where in the example of computing resources a client node representation indicates a failure status, it will not be apparent that a related server also may have failed. Of course, where the server managing the client also has failed, it is likely that the server has caused the failure of the client. Yet, the reality of the circumstance cannot be ascertained from the tree-map representation of the computing system incorporating both the client and the server.

SUMMARY OF THE INVENTION

The present invention is a system, method and apparatus for presenting inter-relationships in a tree-map. The method can include detecting a proximity event about a representation for a node in the tree-map. The method further can include the step of determining through the representation at least one inter-related node. Finally, the nodes can be highlighted and a linkage can be drawn in the tree-map between the nodes. Importantly, in a preferred aspect of the invention, a directionality for the inter-related node can be determined and the directionality can be visually indicated in the tree-map. To that end, the step of visually indicating can include drawing the linkage with arrowheads to indicate the directionality.

The detecting step can include the step of receiving a mouse-over event in an event handler for the tree-map. Alternatively, the detecting step can include the step of receiving a mouse-over event in an event handler for the representation about which the proximity event is detected. As yet a further alternative, the detecting step can include the step of receiving a mouse-click event in an event handler for the tree-map. Finally, the detecting step can include the step of receiving a mouse-click event in an event handler for the representation about which the proximity event is detected. Importantly, each of the detecting, determining, highlighting and drawings steps can be repeated for a selected group of nodes determined to be inter-related to the node for which a proximity event has been detected. Furthermore, the repeating step can be limited to those nodes which are within a specified number of generations from the node for which the proximity event has been detected.

A tree-map visualization system can include a tree-map configured to visualize a set of nodes. The tree-map visualization system also can include an event handler programmed to process a proximity event associated with a specific portion of the tree-map. The event handler can process the proximity event by visually coupling selected nodes which are inter-related to a node associated with the proximity event. The system further can include logic for displaying a direction for each inter-relationship between the selected nodes and the node associated with the proximity event. In this regard, the proximity event can include a mouse-over event, a mouse-click event, and a keyboard selection event.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a system, method and apparatus for displaying aribtrary relationships in a tree-map visualization. Whenever a node in the tree-map receives interest, such as when a mouse pointer passes in proximity to the node of interest, all other nodes with which it has inter-connected relationships will be highlighted, and lines drawn between them conveying the direction of the relationship. In this way, the inter-relationship between the node of interest and other nodes in the tree-map can be visually recognized by one observing the tree-map of the present invention.

Figure 1:
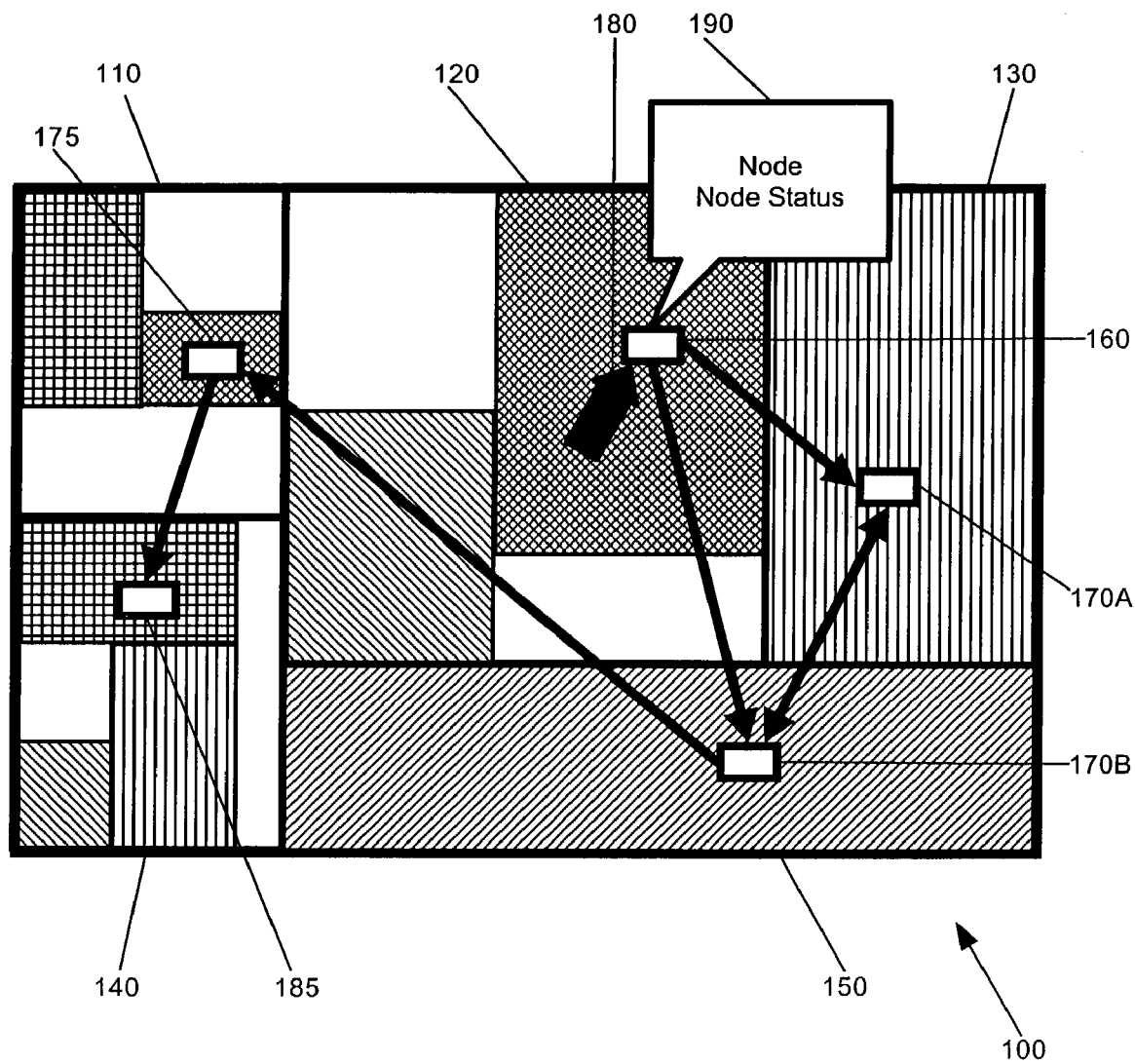
FIG. 1 is pictorial illustration of a tree-map visualization which has been configured in accordance with the inventive arrangements.

FIG. 1 is pictorial illustration of a tree-map visualization which has been configured in accordance with the inventive arrangements. The tree-map 100 can include a multiplicity of nested nodes 110, 120, 130, 140, 150, which can include a composition of one or more additionally nested nodes, which additionally can include further nested nodes, and so forth, such as the nodes 160, 170A, 170B, 175, 185. As it is well-known in the art, a hierarchy of nodes can be displayed in tree-map form. In this regard, in a conventional tree-map where nodes within the tree-map bear some inter-relationship to each other, such inter-relationship will not be apparent from a visual inspection of the tree-map.

In the present invention, however, where a nested node such as the node 160 is inter-related to other nodes in the tree-map 100, such as the nodes 170A, 170B, one viewing the tree-map 100 can recognize the inter-relationship through the visualization of such inter-relationship in the tree-map. If the data behind the tree-map 100 has a small number of inter-relationships, all of the inter-relationships could be visualized at once within the tree-map 100. If, however the number of inter-relationships between nodes exceeds some threshold, the system can interactively visualize only selected ones of the inter-relationships extending from a selected node when the user expresses interest in that node, for example by mouse proximity. More particularly, as a mouse pointer 180 passes within proximity to the node 160, a call-out box 190 not only can be overlain about the node 160, but also the directly related nodes 170A, 170B can be highlighted within their respective parent nodes 130, 150 and connected to the node 160.

In a preferred aspect of the invention, the visual connection between the nodes 170A, 170B and the node 160 can indicate the directionality of the relationship. That is, it can be determined whether the node 160 refers only to the nodes 170A, 170B, the nodes 170A, 170B refer only to the node 160, or whether the nodes 160, 170A, 170B refer to each other. Furthermore, though not illustrated specifically in FIG. 1, other call-out boxes can be overlain over other nodes, or relationships, which are equivalent to node 160. As a consequence, not only will a visual inspection of the treemap 100 indicate whether a relationship subsists between the nodes 160, 170A, 170B, but also the nature of the relationship can be visually ascertained by reference to the treemap of the present invention.

Importantly, the skilled artisan will recognize that the treemap visualization system, method and apparatus of the invention is not merely limited to a first order relationship between the subject node 160 and its related nodes 170. Rather, additional levels of inter-relationships can be visually presented, as well. In this regard, those nodes which are inter-related with the related nodes 170 also can be visually coupled to the nodes 170 such as the node 175 in the examplary illustration of FIG. 1. Furthermore, the node 185 which is inter-related to the node 175 also can be visually indicated. Hence, the process of visually coupling inter-related nodes can continue until the entire hierarchy of inter-related nodes have been depicted in the treemap 100. Nevertheless the invention is not limited to an exhaustive linking of all inter-related nodes and the number of levels explored to that end can be limited to a discrete number.

Figure 2:
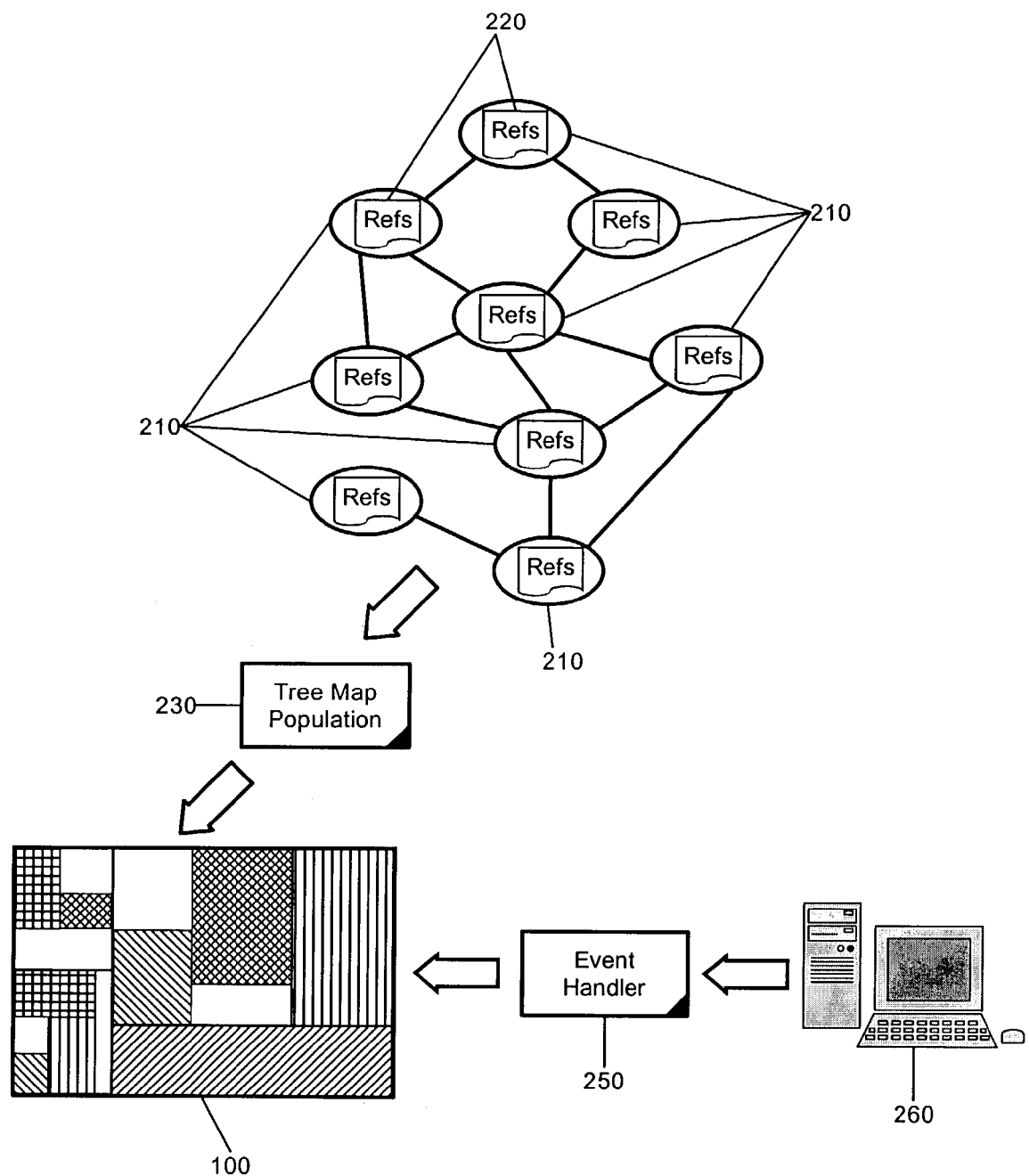
FIG. 2 is a schematic illustration of a tree-map visualization system which has been configured with the tree-map visualization of FIG. 1; and, FIG. 3 is a flow chart illustrating a process for handling arbitrary relationships in the tree-map visualization system of FIG. 2.

FIG. 2 is a schematic illustration of a treemap visualization system which has been configured with the treemap 100 of FIG. 1. The system can include a set of nodes 210 arranged in a hierarchy in which multiple nodes incorporate common nodes among one another. Each node can include one or more references 220 to other nodes 210. A treemap population process 230 can process the set of nodes 210 into a treemap 100. Importantly, based upon the references 220 within the nodes 210, inter-relationships between the nodes 220 can be ascertained merely by "walking" the referenced nodes 210.

The system further can include an event handler 250 programmed to process operating system events received through a user interface 260 to the treemap 100. Specifically, operating system events such as mouse movements, keyboard strikes and mouse clicks can be received in the user interface 260 and routed to the event handler 250. The event handler 250 can determine when the received operating system event should be interpreted as a request to identify an underlying node in the treemap 100. To that end, the operating system event can range from a simple mouse click upon a portion of the treemap corresponding to the node, to a mouse-over event in which the mouse pointer passes over the portion of the treemap corresponding to node.

In any case, responsive to the receipt of such an event, the identity of the underlying node associated with the portion of the treemap 100 can be presented through the user interface 260. For instance, a call-out box can be displayed in a similar manner to a tool-tip in which the identity of the node and ancillary data can be displayed such as the status of the node. Significantly, in addition to displaying the call-out box, the treemap 100 can be searched for inter-related ones of the nodes 210 based upon the reference 220 to inter-related nodes contained within the selected node. For each found node, a visual linkage can be interactively presented in the treemap 100 to indicate not only the existence of the inter-relationship, but also the nature of the inter-relationship. As such, arrows at one or both ends of the linkage can indicate the directionality of the inter-relationship. Moreover, the coloring of the arrows, the linkage or both further can indicate the nature of the inter-relationship.

Figure 3:
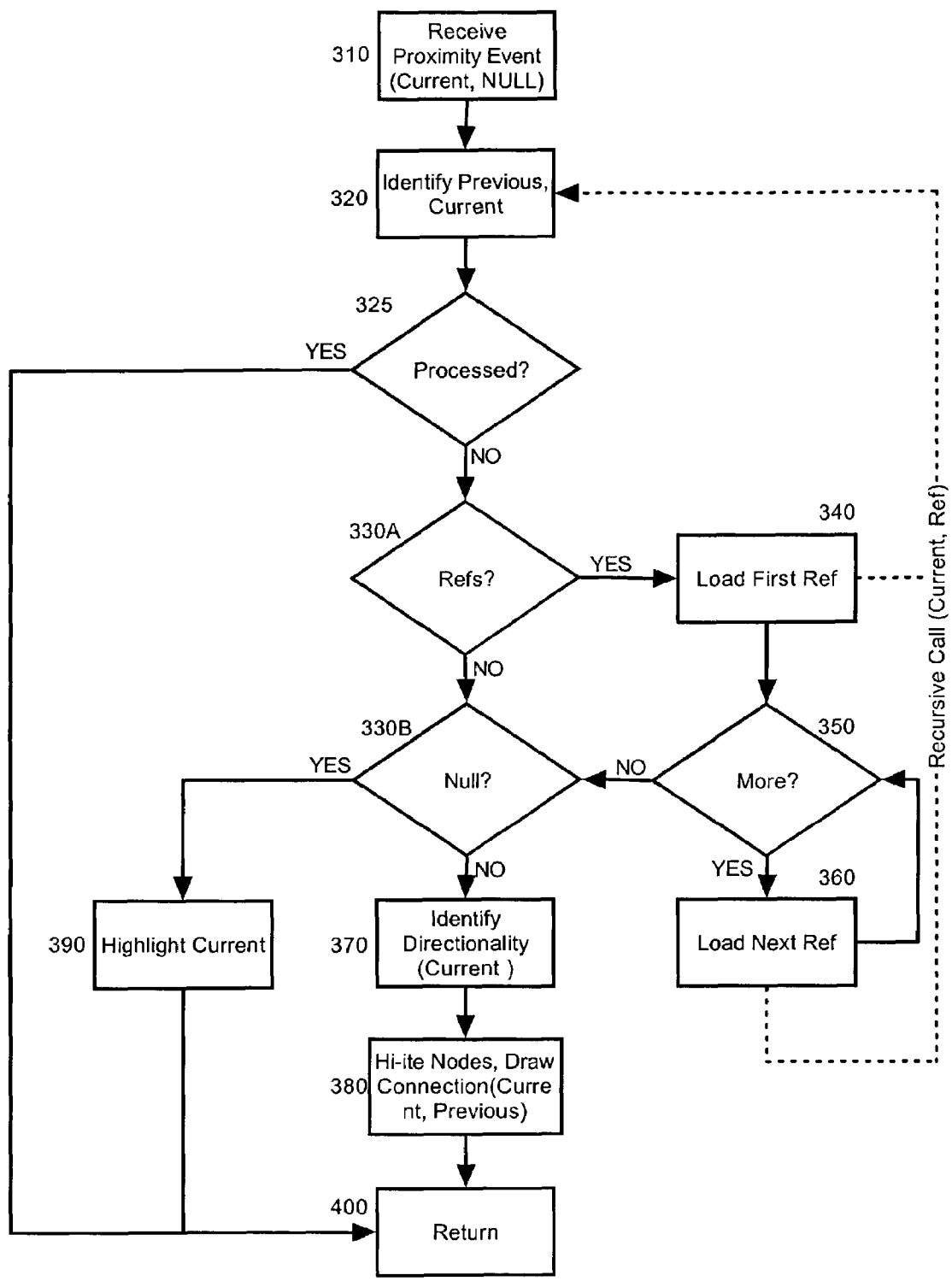

FIG. 3 is a flow chart illustrating a process for handling inter-related nodes in the treemap visualization system of FIG. 2. In step 310, a proximity event can be received in an event handler in which the proximate node has been specified. The proximity event can include, but is not limited to mouse and keyboard induced movements which are proximate to a region of a treemap representing the underlying node. In block 320, the underlying node can be identified. In decision block 325, it can be determined if the underlying node already has been processed (to avoid infinite loops). In decision block 330A, the underlying node can be inspected for references to inter-related nodes. If in no references are found, and if in decision block 330B there exists no referring node, in block 390 the node can be highlighted within the treemap and the process can terminate in block 400.

Otherwise, if references are identified with the underlying node in decision block 330A, in block 340 the first referenced node can be loaded and the process of blocks 320 through 340 can be called recursively by reference both to the current node and the referenced node. Notably, the process of blocks 320 through 340 can be repeated in a recursive manner until a terminating node is identified as the current node. In that case, in block 370 the directionality between the terminating nodes and its referring node can be determined by examining the internal representation of their relationships to see if the current node refers to the referenced node, if the referenced node refers to the current node, or if both refer to each other.

In any case, in block 380, the current node can be highlighted as can the referencing node and a connection can be drawn between the two with arrowheads indicating the directionality. In block 400, the process can return. Notably, the process of blocks 320 through 340 can be repeated for each referenced node in a current node as will be apparent from blocks 340 and 360. Once no more references remain to be analyzed and processed as determined by the decision block 350, the visual coupling can be drawn within the treemap and the recursive process can unwind further until the root node under study has been reached. In that event, the final coupling can be drawn and the process can terminate in block 400.

Significantly, it will be apparent to the skilled artisan that the process shown in FIG. 3 depicts only the circumstance where the root node under study references a hierarchy of other inter-related nodes. Yet, the invention is not so limited. Rather, in an alternative embodiment, where the root node understudy does not reference other nodes, but where other nodes reference the root node under study, a comparable process similar to the process of blocks 330A through 400 can be performed for the nodes which reference the root node under study. Furthermore, while the process of FIG. 1 exhaustively identifies an entire hierarchy of inter-related nodes, again the invention is not so limited and the depth to which inter-related nodes are visually shown in the treemap can be limited to a discrete number of levels of inter-relationships.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods. Finally, the user interface of the computer program product can be a user interface expressed through a content browser.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A method, within a treemap visualization hardware system, for presenting inter-related nodes in a treemap, the treemap comprising hierarchical information to a rectangular 2-D display in a space-filling manner in which the entirely of a designated display space is utilized, the method comprising the steps of:
   detecting, by the treemap visualization hardware system, a proximity event about a representation for a node in the treemap;
   determining through said representation at least one inter-related node; and,
   highlighting said nodes and drawing a linkage in said treemap between said nodes.

2. The method of claim 1, further comprising the steps of:
   determining a directionality for said inter-related node; and,
   visually indicating said directionality in said treemap.

3. The method of claim 2, wherein said step of visually indicating comprises the step of drawing said linkage with arrowheads to indicate said directionality.

4. The method of claim 1, wherein said detecting step comprises the step of receiving a mouse-over event in an event handler for the treemap.

5. The method of claim 1, wherein said detecting step comprises the step of receiving a mouse-over event in an event handler for said representation about which said proximity event is detected.

6. The method of claim 1, wherein said detecting step comprises the step of receiving a mouse-click event in an event handler for the treemap.

7. The method of claim 1, wherein said detecting step comprises the step of receiving a mouse-click event in an event handler for said representation about which said proximity event is detected.

8. The method of claim 1, further comprising the step of repeating said detecting, determining, highlighting and drawings steps for a selected group of nodes determined to be inter-related to said node for which a proximity event has been detected.

9. The method of claim 8, wherein said repeating step is limited to those nodes which are within a specified number of generations from said node for which said proximity event has been detected.

10. The method of claim 8, wherein said repeating step is performed for all inter related nodes if a number of inter-relationships falls below a pre-specified threshold value.

11. A treemap, the treemap comprising hierarchical information to a rectangular 2-D display in a space-filling manner in which the entirely of a designated display space is utilized, visualization hardware system comprising:
   a treemap configured to visualize a set of nodes; and a processor including an event handler programmed to process a proximity event associated with a specific portion of said treemap by visually coupling selected nodes which are interrelated to a node associated with said proximity event.

12. The system of claim 11, further comprising logic for displaying a direction for each inter-relationship between said selected nodes and said node associated with said proximity event.

13. The system of claim 11, wherein said proximity event is selected from the group consisting of a mouse-over event, a mouse-click event, and a keyboard selection event.

14. A machine readable storage having stored thereon a computer program for presenting inter-related nodes in a treemap, the treemap comprising hierarchical information to a rectangular 2-D display in a space-filling manner in which the entirely of a designated display space is utilized, the computer program comprising a routine set of instructions for causing the machine to perform the steps of:

detecting a proximity event about a representation for a node in the treemap;

determining through said representation at least one inter-related node; and, highlighting said nodes and drawing a linkage in said treemap between said nodes.

15. The machine readable storage of claim 14, further comprising the steps of:

determining a directionality for said inter-related node; and, visually indicating said directionality in said treemap.

16. The machine readable storage of claim 15, wherein said step of visually indicating comprises the step of drawing said linkage with arrowheads to indicate said directionality.

17. The machine readable storage of claim 14, wherein said detecting step comprises the step of receiving a mouse-over event in an event handler for the treemap.

18. The machine readable storage of claim 14, wherein said detecting step comprises the step of receiving a mouse-over event in an event handler for said representation about which said proximity event is detected.

19. The machine readable storage of claim 14, wherein said detecting step comprises the step of receiving a mouse-click event in an event handler for the treemap.

20. The machine readable storage of claim 14, wherein said detecting step comprises the step of receiving a mouse-click event in an event handler for said representation about which said proximity event is detected.

21. The machine readable storage of claim 14, further comprising the step of repeating said detecting, determining, highlighting and drawings steps for a selected group of nodes determined to be inter-related to said node for which a proximity event has been detected.

22. The machine readable storage of claim 21, wherein said repeating step is limited to those nodes which are within a specified number of generations from said node for which said proximity event has been detected.

23. The machine readable storage of claim 21, wherein said repeating step is performed for all inter-related nodes if a number of inter-relationships falls below a pre-specified threshold value.

\* \* \* \* \*